United States Patent [19]
Abe et al.

[11] Patent Number: 5,739,006
[45] Date of Patent: Apr. 14, 1998

[54] PROCESS OF FEEDING JUVENILE FISH WITH ASTAXANTHIN-CONTAINING ZOOPLANKTON

[75] Inventors: Toshio Abe; Atsushi Nakagawa, both of Ube; Hiroshi Higuchi, Hofu; Tatsuro Yamanaka, Ube, all of Japan

[73] Assignee: Kyowa Hakko Kogyo Co., Ltd., Tokyo, Japan

[21] Appl. No.: 536,142

[22] Filed: Sep. 29, 1995

Related U.S. Application Data

[63] Continuation of Ser. No. 185,884, filed as PCT/JP93/00709 May 27, 1993, abandoned.

[30] Foreign Application Priority Data

May 28, 1992 [JP] Japan ................... 4-136751
Oct. 1, 1992 [JP] Japan ................... 4-263400

[51] Int. Cl.$^6$ ................................ A23K 1/18
[52] U.S. Cl. .................. 435/67; 435/258.1; 435/132; 435/147; 426/59; 426/60; 426/61; 426/62; 424/93.21
[58] Field of Search .................. 435/258.1, 67, 435/132, 147; 426/59, 60, 61, 62; 424/93.21; 800/2, DIG. 4

[56] References Cited

FOREIGN PATENT DOCUMENTS 2238855   9/1990   Japan.
3227241   12/1991  Japan.

OTHER PUBLICATIONS

Partali et al. *Comp. Biochem Physiol.* vol. 82 B, pp. 767–772, 1985.
Beneman, J.R., *J of Appl. Phy col.* vol. 4, pp. 233–245, 1992.
Paanakker et al. *Comp. Biochem Physiol.* vol. 60 B, pp. 51–58, 1978.
Foss et al. *Comp. Biochem Physiol.* vol. 86 B pp. 313–314, 1987.

*Primary Examiner*—Irene Marx
*Attorney, Agent, or Firm*—Antonelli, Terry, Stout, & Kraus, LLP

[57] ABSTRACT

The present invention relates to astaxanthin-containing zooplankton such as *Brachionus pricatilis* obtained by culturing, a method for culturing the zooplankton in a liquid containing astaxanthin and a method for breeding fry fish by feeding the above astaxanthin-containing zooplankton.

The survival rate in breeding fry fish may be remarkably improved by feeding the astaxanthin-containing zooplankton to fry fish.

7 Claims, No Drawings

PROCESS OF FEEDING JUVENILE FISH WITH ASTAXANTHIN-CONTAINING ZOOPLANKTON

This application is a continuation application of application Ser. No. 185,884, filed Jan. 26, 1994, now abandoned, which application is a 371 of PCT/JP93/00709, filed May 27, 1993.

TECHNICAL FIELD

The present invention relates to astaxanthin-containing zooplankton and a method for breeding fry fish by feeding the zooplankton to fry fish.

BACKGROUND ART

Cultured zooplankton such as *Brachionus plicatilis* have been fed as a live feed for breeding fry or larval and juvenile fish. Chlorella and yeast are used as a feed for culturing *Brachionus plicatilis*, but it has not been known that astaxanthin-producing chlorella and yeast can be used as a feed for zooplankton.

In natural surroundings, hatched larval and juvenile fish feed on carotenoid-containing crustacean plankton. Artificially cultured zooplankton such as *Brachionus plicatilis* greatly differ from naturally occurring crustacean plankton in their carotenoid content. In particular, *Brachionus plicatilis* cultured so far does not contain astaxanthin.

On the other hand, astaxanthin is fed to cultured redfish to improve their body color, and it is publicly known that synthetic astaxanthin and astaxanthin-producing yeast belonging to the species *Phaffia rhodozyma* can be used as sources of astaxanthin (JP-A-206342/82).

In recent years, the importance of commercial aquaculture is increasing, and the survival rate for the breeding of larval and juvenile fish is an important factor for the establishment of the aquaculture. The survival rate of larval and juvenile fish bred by the existing methods is sometimes considerably lowered due to disease. In the circumstances, it has been desired to develop a method for the stable breeding of larval and juvenile fish at a high yield.

DISCLOSURE OF THE INVENTION

The present invention relates to astaxanthin-containing zooplankton obtained by culturing the zooplankton to accumulate astaxanthin therein and a method for breeding larval and juvenile fish by feeding the zooplankton to larval and juvenile fish.

According to the present invention, there is provided zooplankton accumulating astaxanthin by culturing. The survival rate of larval and juvenile fish can be considerably improved by feeding said plankton to larval and juvenile fish during their breeding.

The zooplankton of the present invention may be obtained by feeding astaxanthin thereto during its culturing.

As the zooplankton, there may be used Artemia, Moina, and preferably rotifer such as *Brachionus plicatilis*.

The astaxanthin used for feeding the zooplankton may be astaxanthin itself or a substance containing it. Examples thereof include astaxanthin-containing oils obtained by extraction from crustaceans, astaxanthin produced by synthetic methods, astaxanthin-producing yeast or processed products thereof and astaxanthin-producing algae.

The astaxanthin-producing yeast may be, for example, *Phaffia rhodozyma*, which is commercially available and easily accessible. In addition, yeast cells obtained by culturing *Phaffia rhodozyma* may be used.

*Phaffia rhodozyma* are listed in ATCC catalog, for example, strains 24201, 24202, 24203, 24228, 24229, 24230 and 24261 are available. The strains themselves may be cultured by a publicly known method; for example, the culturing may be carried out according to the method described in JP-A-262777/92, EP-A-454024, WO88/08025, etc.

As the yeast, there may be used living cells, dried cells, frozen cells and processed products such as cells treated with an organic solvent and grounded cells.

Any algae can be used, so long as it has the ability to produce astaxanthin, examples of which include unicellular green algae belonging to the genus Haematococcus, Scenedesumus, Chlorella, Dunaliella, etc.

The zooplankton may be cultured by a publicly known method. For example, zooplankton are farmed at a density of 20–500 organisms/ml in sea water or freshwater under aerobic conditions, fed baker's yeast or marine chlorella in an amount of 0.1–5 g/$10^6$ zooplankton/day and cultured at a temperature of 20°–30° C. to breed the zooplankton.

The accumulation of astaxanthin in the zooplankton is accomplished by adding to the culture 10–10,000 ppm astaxanthin or 0.05–2.0 g wet weight of astaxanthin-producing yeast or algae/$10^6$ zooplankton/day singly or in combination. Baker's yeast or other algae may be added to the culture.

In order to accumulate astaxanthin in the zooplankton, culturing is needed at least for 3 hours after feeding astaxanthin. The method of culturing is batch culture or continuous culture.

By culturing in this manner, astaxanthin can be accumulated in the zooplankton at a concentration of 50–5,000 ppm on dry weight basis.

The resulting astaxanthin-containing zooplankton may be fed to larval and juvenile fish as a feed singly or in combination with other feed ingredients.

In breeding larval and juvenile fish using the astaxanthin-containing zooplankton of the present invention, a conventionally used method for the breeding of larval and juvenile fish may be employed except that astaxanthin-containing zooplankton is used instead of conventionally used zooplankton. Generally, the zooplankton is fed to larval and juvenile fish in an amount of $7 \times 10^4$–$3 \times 10^6$ organisms/1,000 larval and juvenile fish/day. The fry fish applied include fish such as flounder, sea bream, lake white fish, milkfish, sea bass and malabar or crustaceans such as swimming crab and shrimp.

BEST MODE FOR CARRYING OUT THE INVENTION

The present invention is described in more detail by referring to Examples.

EXAMPLE 1 (PRODUCTION OF ASTAXANTHIN-CONTAINING *BRACHIONUS PLICATILIS*

Each of six groups of S-type *Brachionus plicatilis*, each group consisting of $6 \times 10^6$ organisms, was put in water in a 30-1 tank. To each group was fed 6 g of *Phaffia rhodozyma* (frozen cells, containing 3,000 ppm astaxanthin on dry weight basis) in a day. Samples were taken at 0, 6, 12, 24, 48 and 72 hours after feeding the yeast to analyze the astaxanthin (free-type) accumulated in *Brachionus pricatilis*.

The result is shown in Table 1.

TABLE 1

| Culture time (HR) | Total carotenoid (ppm) | Astaxanthin (ppm) |
| --- | --- | --- |
| 0 | 25 | 0 |
| 6 | 200 | 129 |
| 12 | 208 | 137 |
| 24 | 218 | 151 |
| 48 | 225 | 164 |
| 72 | 391 | 320 |

EXAMPLE 2 (PRODUCTION OF ASTAXANTHIN-CONTAINING ARTEMIA)

Dry eggs of Artemia were put into sea water diluted with fresh water to the concentration of ½, and then stirred under aeration for 48 hours while keeping the temperature of the water at 25° C. After the completion of hatching was confirmed, the larvae of Artemia and the egg shells were separated.

Into 30 liter of a liquid in a separate tank prepared by diluting sea water with an equivolume of water were put larvae of Artemia at a density of 10 organisms/ml. The larvae were cultured by feeding feed prepared by mixing Phaffia rhodozyma (containing 3,000 ppm astaxanthin on dry weight basis) and high unsaturated fatty acid supplemented yeast (feed for culturing plankton, product of Kyowa Hakko Kogyo Co.) at a proportion of 1 to 2 on dry weight basis (Phaffia yeast:high unsaturated fatty acid supplemented yeast=1:2) in an amount of 3–6 g a day, and cultured for 7 days at 25° C.

After the completion of the culturing, Artemia was collected with a collection cloth, and the amount of both total carotenoid and astaxanthin were analyzed.

The analysis was made regarding larva A immediately after hatching and larva B seven days after feeding and culturing, and the amount of astaxanthin accumulated was calculated based on both values.

The result is shown in Table 2.

TABLE 2

| | Total carotenoid (ppm) | Astaxanthin (ppm) |
| --- | --- | --- |
| A | 587 | trace |
| B | 872 | 450 |

EXAMPLE 3 (PRODUCTION OF ASTAXANTHIN-CONTAINING Brachionus Plicatilis)

As an astaxanthin source, an algae Haematococcus lacustris was used, and the algae was cultured in a 5-l glass Erlenmeyer flask in the medium having the composition shown below. The culturing was carried out at 25° C. for 21 days while aerating aseptic air thereinto under irradiation with a fluorescent lamp at 3,000 lux with a 12-hour period of light and a 12-hour period of darkness.

The culture was subjected to centrifugation to obtain algae containing 5,000 ppm astaxanthin on dry weight basis.

Into a culture tank were put $3 \times 10^6$ S-type Brachionus plicatilis and 30 liter of sea water, and Brachionus plicatilis were fed a mixture of the above mentioned algae and high unsaturated fatty acid supplemented yeast "Kyowa" (Haematococcus algae:high unsaturated fatty acid supplemented yeast=1:1, on dry weight basis) in an amount of 3–6 g a day and cultured for 5 days at 25° C. The amount of astaxanthin accumulated in Brachionus plicatilis was analyzed (group A fed Haematococcus algae).

The analysis is also made simultaneously regarding Brachionus plicatilis (control group B) cultured as a control in the same manner described above except for using Baker's yeast instead of Haematococcus algae, and the amount of astaxanthin accumulated therein was calculated.

| Culture medium composition | |
| --- | --- |
| $Ca(NO_3)_2 \cdot 4H_2O$ | 15 mg |
| $KNO_3$ | 10 mg |
| $MgSO_4 \cdot 7H_2O$ | 4 mg |
| β-glycerophosphate (sodium salt) | 5 mg |
| Vitamin $B_1$ | 1 µg |
| Vitamin $B_{12}$ | 0.01 µg |
| Biotin | 0.01 µg |
| Tris buffer | 50 mg |
| PIV metal mixed solution | 0.3 ml |
| Distilled water | 99.7 ml |
| | pH 7.5 |
| PIV metal mixed solution | |
| $FeCl_3 \cdot 6H_2O$ | 19.6 mg |
| $MnCl_2 \cdot 4H_2O$ | 3.6 mg |
| $ZnCl_2$ | 1.05 mg |
| $CoCl_2 \cdot 6H_2O$ | 0.4 mg |
| $NaMoO_4 \cdot 2H_2O$ | 0.25 mg |
| $Na_2EDTA \cdot 2H_2O$ | 100 ml |
| Distilled water | 100 ml |

The result is shown in Table 3.

TABLE 3

| | Total carotenoid (ppm) | Astaxanthin (ppm) |
| --- | --- | --- |
| A | 325 | 255 |
| B | 8.5 | 1.3 |

A: Group fed Haematococcus algae
B: Control group

EXAMPLE 4 [EFFECT OF FEEDING ASTAXANTHIN TO FLOUNDER]

Two groups of fry of flounder (2 days after hatching), each group consisting of 1,000, were prepared. Each group was put into 100 liter of sea water. Brachionus plicatilis (group fed on astaxanthin) (A) obtained by culturing for 24 hours in the same manner as in Example 1 and Brachionus plicatilis (group fed no astaxanthin) (B) obtained by culturing for 24 hours in the same manner as in Example 1 except for using baker's yeast instead of Phaffia rhodozyma were each occasionally fed in an amount of $3 \times 10^5 - 2 \times 10^6$ organisms/tank/day to each group of fry of flounder.

The number of the fry of flounder surviving on the 30th day after feeding the rotifer are shown in Table 4.

TABLE 4

| | Number of surviving | Survival rate (%) |
| --- | --- | --- |
| Group fed astaxanthin (A) | 692 | 69.2 |
| Group fed no astaxanthin (B) | 386 | 38.6 |

EXAMPLE 5 [EFFECT OF FEEDING ASTAXANTHIN TO RED SEA BREAM]

Fry of red sea bream was bred in the same manner as in Example 4 except that fry of red sea bream(2 days after hatching) was used instead of fry of flounder.

The number of surviving and survival rate of the fry of red sea bream in a group fed astaxanthin (A) and those in a group fed no astaxanthin (B) on the 30th day after feeding *Brachionus plicatilis* are shown in Table 5.

TABLE 5

|  | Number of surviving | Survival rate (%) |
| --- | --- | --- |
| Group fed astaxanthin (A) | 763 | 76.3 |
| Group fed no astaxanthin (B) | 252 | 25.2 |

EXAMPLE 6 [EFFECT OF FEEDING ASTAXANTHIN TO SWIMMING CRAB]

Two groups of swimming crab(one day after hatching), each group consisting of 3,000 swimming crab, were prepared. Each group was put into 100 liter of marine water. *Brachionus plicatilis* (group fed on astaxanthin) (A) obtained by culturing for 24 hours in the same manner as in Example 1 and *Brachionus plicatilis* (group fed no astaxanthin) (B) obtained by culturing as a control for 24 hours in the same manner as in Example 1 except for using baker's yeast instead of *Phaffia rhodozyma*, were each occasionally fed to each group in an amount of $1 \times 10^5 - 2 \times 10^6$ organisms/tank/day to breed the swimming crab.

The number of surviving of the swimming crab on the 12th day after feeding the rotifer is shown in Table 6.

TABLE 6

|  | Number of surviving | Survival rate (%) |
| --- | --- | --- |
| Group fed astaxanthin (A) | 1860 | 62.0 |
| Group fed no astaxanthin (B) | 990 | 33.0 |

Industrial Applicability

The astaxanthin-containing zooplankton according to the present invention may be used as a feed for the breeding of larval and juvenile fish.

We claim:

1. A method of increasing the survival rate of larval and juvenile fish or juvenile crustaceans in aquaculture breeding comprising:

feeding to said larval and juvenile fish or juvenile crustaceans a composition comprising astaxanthin-containing zooplankton selected from the group consisting of rotifers belong the genus Brachionus and crustaceans belonging to the genus Artemia, in an amount of $7 \times 10^4$ to $3 \times 10^6$ astaxanthin-containing zooplankton/1000 larval and juvenile fish/day to increase the survival rate of said larval and juvenile fish or juvenile crustaceans, wherein said astaxanthin-containing zooplankton has an intracellular accumulation of astaxanthin at a concentration of 50–5000 ppm on a dry weight basis, and wherein said astaxanthin-containing zooplankton is produced by culturing said rotifers belonging to the genus Brachionus and said crustaceans belonging to the genus Artemia on nutrient culture media comprising astaxanthin-containing yeasts belonging to Pfaffia or astaxanthin-containing algae belonging to Haematococcus for a time and at conditions sufficient to obtain said astaxanthin-containing zooplankton.

2. A method according to claim 1, wherein the zooplankton is a rotifer belonging to *Brachionus plicatilis*.

3. A method according to claim 1, wherein said fish is selected from the group consisting of flounder, sea bream, lake white fish, milk fish, sea bass and malabar.

4. A method according to claim 3, wherein said fish is selected from the group consisting of flounder and sea bream.

5. A method according to claim 4, wherein the zooplankton is a rotifer belonging to *Brachionus plicatilis*.

6. A method according to claim 1, wherein said juvenile crustaceans are selected from the group consisting of swimming crab and shrimp.

7. A method according to claim 6, wherein said juvenile crustaceans are swimming crab.

* * * * *